Figure 1:
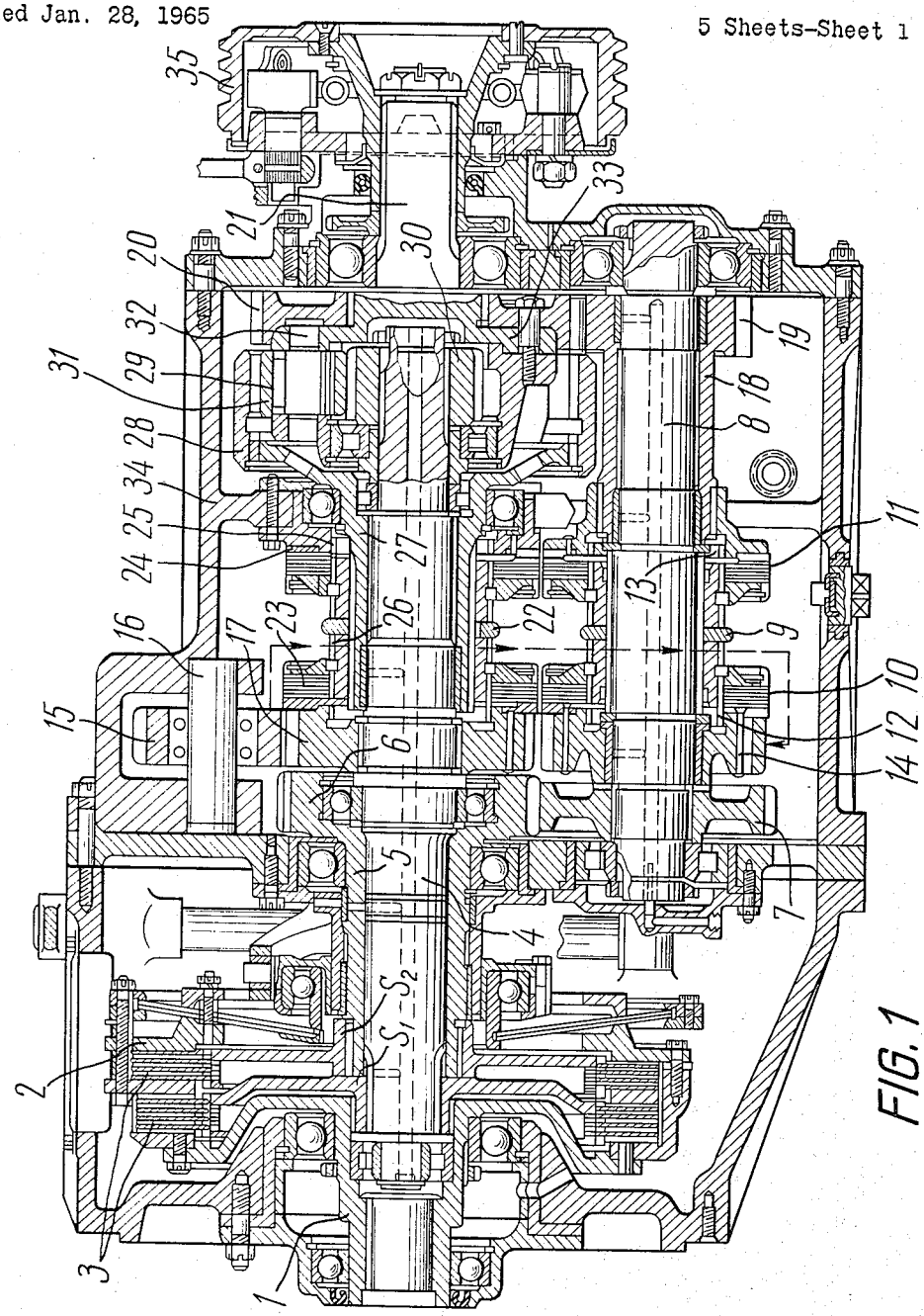

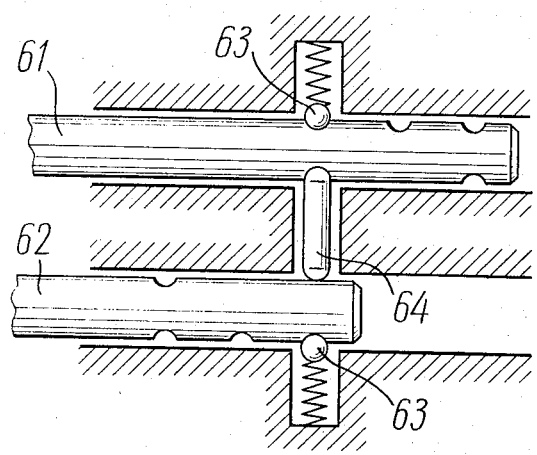
FIG. 4
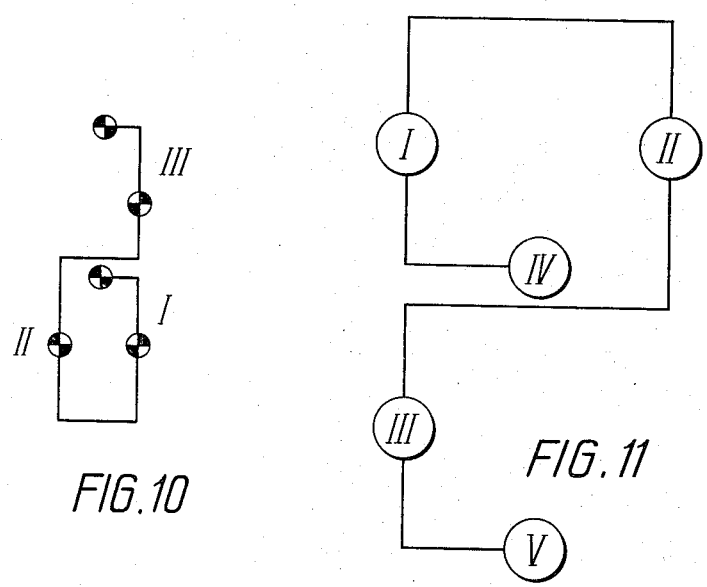
FIG. 10
FIG. 11

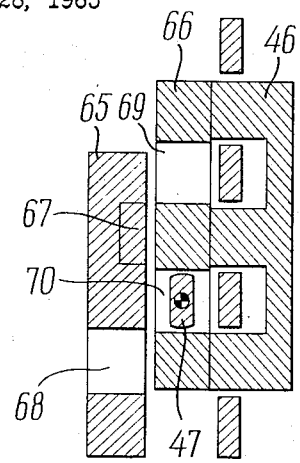
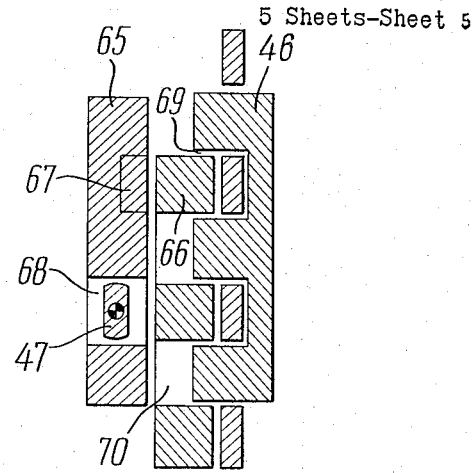
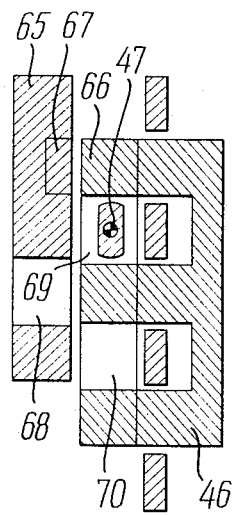
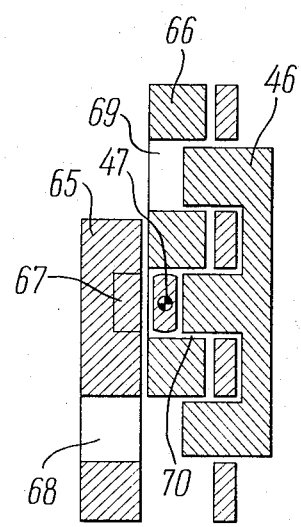
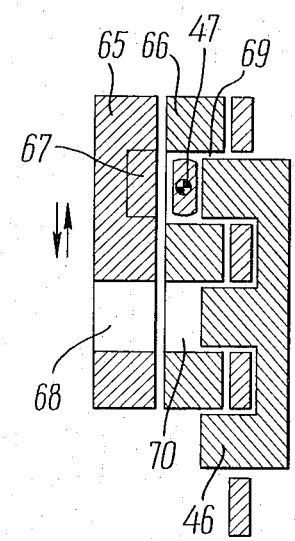

United States Patent Office 3,357,276
Patented Dec. 12, 1967

3,357,276
TRANSMISSION AND ITS CONTROL
Vasily Andreevich Vavulo, Marat Dmitrievich Girko, Vladimir Kuzmich Masjukov, Boris Efimovich Mitin, and Igorj Sergeevich Tsitovich, Minsk, U.S.S.R., assignors to Belorussky Politekhnichesky Institute, Minsk, U.S.S.R.
Filed Jan. 28, 1965, Ser. No. 428,698
4 Claims. (Cl. 74—740)

This invention relates to transmissions, more specifically to three-range transmissions with two kinematic chains operating alternatively without interruption of power flow.

A transmission has been known hitherto which has two kinematic chains operating alternately without interruption of power flow and consists of a case accommodating a double clutch with driven discs connected to a primary shaft and a countershaft, and coupling elements with synchronizers.

This transmission is deficient in that it presents difficulties in the use thereof with a gas-turbine engine. As compared with the transmissions used in conjunction with piston engines, the transmissions intended for gas-turbine engines must meet the following additional requirements:

When making gearshifts, the output shaft of the gas-turbine engine must always be under load.

Provision must be made for the motor vehicle to be braked with the gas-turbine engine by virtue of reversing the power turbine.

Failure to meet the first requirement will result in gas-turbine racing with consequent breakdown.

To meet the second requirement, the transmission should be provided with special arrangements, one of which will allow reversal of mainshaft rotation, whereas the other will ensure absorption of the energy released as the power turbine stalls and will provide for driving the turbine in reverse.

Therefore the conventional ranged transmission cannot be used in conjunction with gas-turbine engines unless provision is made for special automatically controlled braking arrangements.

The use of special braking ararngements in the power units of gas-turbine automobiles necessitates, firstly, increase in dimensions and weight of the power unit; secondly, interruption of the power flow which adversely affects the vehicle performance and fuel consumption; thirdly, complication of control of the power unit.

The main object of the present invention is to devise a transmission that will ensure reversal of direct drive for braking the vehicle with the engine and provide for driving the turbine shaft in reverse.

Another object of this invention is to permit the vehicle to be shifted in reverse in first gear without interruption of power flow.

Still another object of this invention is to simplify gearshift control, uninterrupted power flow being ensured.

This invention also makes for reduction in transmission dimensions due to of reversing direct drive for braking the vehicle with the engine.

In accordance with the aforesaid and other objects the present invention consists in a novel arrangement and combination of parts as described herein and claimed in the appended claims.

Other objects and advantages of the invention will be apparent from the following description with reference to the accompanying drawings which depict one of the possible embodiments of the proposed transmission.

Figure 2:
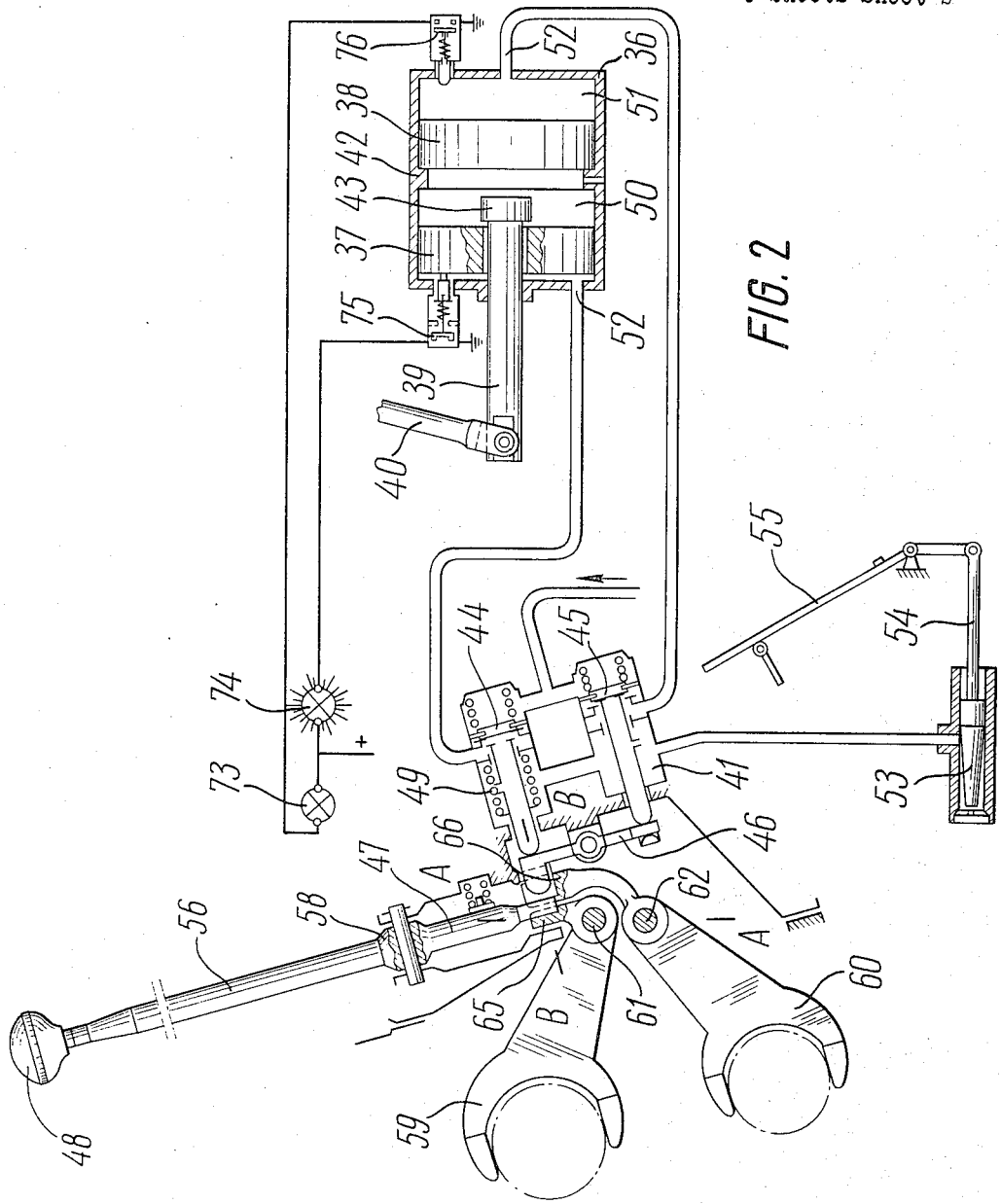
Figure 3:
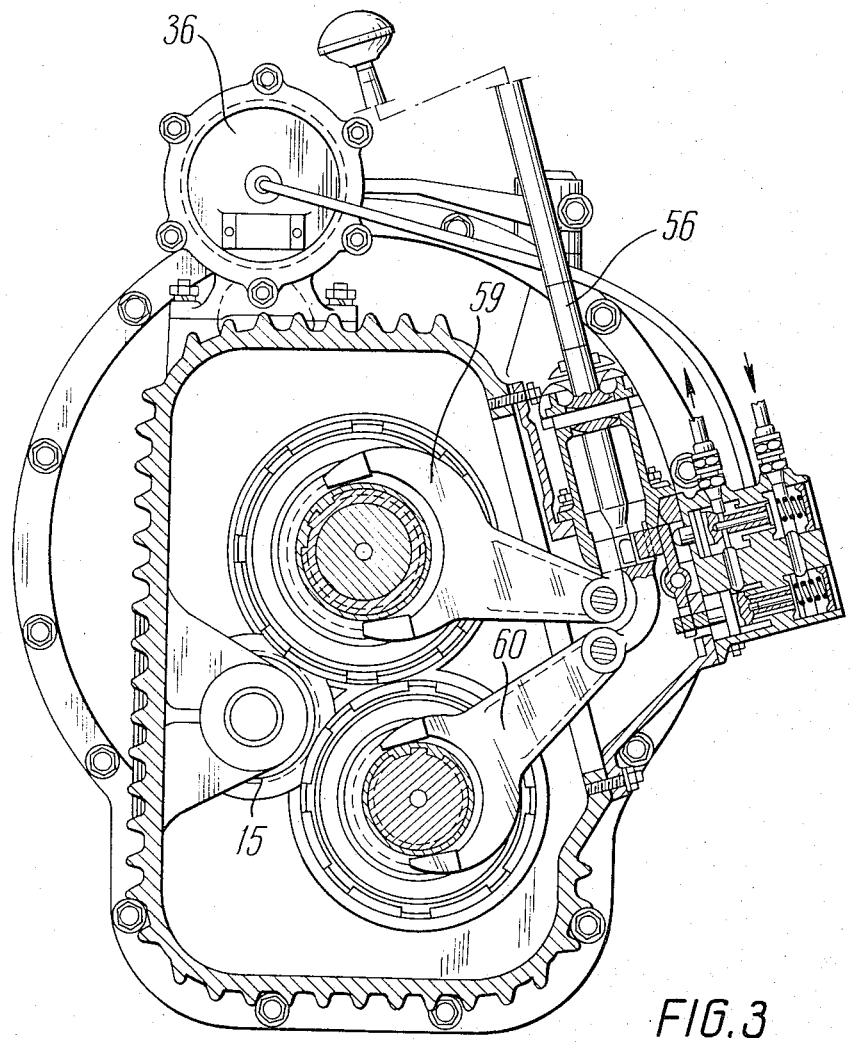

FIG. 1 is a diagrammatic layout of the transmission.
FIG. 2 is a diagram of the transmission pneumo-mechanical control system.
FIG. 3 shows the layout of the transmission controls.
FIG. 4 is section on line A—A of FIG. 2.
FIGS. 5 through 9 show the relative positions of shifter forks and gearshift lever in various gears (section on line B—B of FIG. 2), viz.
FIG. 5 refers to first speed.
FIG. 6 refers to second speed.
FIG. 7 refers to third speed.
FIG. 8 refers to reverse speed.
FIG. 9 refers to braking the vehicle with the engine.
FIG. 10 shows the position of the bottom end of the gear shift lever in making gearshifts.
FIG. 11 shows the position of the top end of the gearshift lever in making gearshifts.

Referring to FIG. 1, the torque from the engine is transmitted to clutch case 1, attached to which are driving discs 2 alternately interacting with driven discs 3 of clutches $S_1$ and $S_2$. In the transmission design under consideration the clutches are housed in an individual case which can be separated from the main case if necessary, whereby provision is made for use of any type of friction clutch with said transmission. Clutches $S_1$ and $S_2$ are made as a unit with a common pressure mechanism and controls.

Each clutch has several driven discs with cerametallic facings. Oil is supplied to the discs through the drillings made in central mainshaft 4 fixed to which is clutch $S_1$. Clutch $S_2$ is connected to hollow shaft 5.

Fixed to shaft 5 is pinion 6 constantly meshed with gear 7 which drives countershaft 8. Countershaft 8 carries operating sleeve 9 of synchronizers 10 and 11 interacting with coupling elements 12 and 13. Coupling element 12 is connected to the hub of reverse gear 14 which is in constant mesh with gear 15 mounted on shaft 16 and with gear 17 mounted on shaft 4.

Coupling element 13 ends in sleeve 18 which has gear 19 meshed with gear 20 mounted on shaft 21.

Synchronizers 23 and 24 of first and third speed coupling elements 25 and 26 have an operating sleeve 22 which is splined over hollow shaft 27 fixed to ring gear 28 of epicyclic gear train 29. Apart from the ring gear, the epicyclic gear comprises sun gear 30, planet pinions 31 and planet carrier 32. Sun gear 30 is mounted on shaft 4. Planet carrier 32 is connected to hub 33 of gear 20. Ring gear 28 can be connected to transmission case 34 by means of coupling element 25, or to shaft 4 by means of coupling element 26.

Epicyclic gear train 29 is introduced in the transmission construction in order to eliminate radial loads on the bearings of the principal shafts when operating in first gear, whereby longevity of the gearbox parts is furnished. Apart from this, the use of epicyclic gear train 29 enables operating sleeves 9 and 22 to be located in the same transverse plane, with consequent reduction in the dimensions of the transmission.

Uninterrupted power flow is obtained by making successive gearshifts. This means that shifts may be made from first gear to second, and from second to third or first. From third gear shifts are possible to second gear or to braking the vehicle with the engine.

Gearshifts are made in two stages. During the first stage operating sleeves 9 and 22 are moved in the necessary direction until the tooth rims of the coupling element are fully in mesh. During the second stage clutches $S_1$ and $S_2$ are operated simultaneously so that one clutch is released whilst the other is engaged.

The use of coupling elements and synchronizers 10, 11, 23 and 24 enables the power flow in the respective kinematic chain to be maintained uninterrupted.

Since torques and relative rotational speeds of the mating parts in the transmission are high, obviating gearshift clashes has necessitated the use of multiple-disc inertia synchronizers 10, 11, 23 and 24.

When operating in second gear, preliminary shifts into first and third gears may be made by means of coupling elements 25 and 26 with clutch $S_1$ disengaged.

Preliminary shifting into second or reverse gear may be made when operating in first or third gear, by means of coupling elements 12 and 13, with clutch $S_2$ disengaged.

Power flow through the transmission is as shown below by way of reference characters.

First speed: 1, $S_1$, 4, 30, 31, 32, 33, 21.
Second speed: 1, $S_2$, 5, 6, 7, 8, 9, 11, 13, 18, 19, 20, 33, 21.
Third speed: 1, $S_1$, 4, 29, 33, 21.
Reverse: 1, $S_2$, 5, 6, 7, 8, 9, 10, 12, 14, 15, 17, 4, 30, 31, 32, 33, 21.
Braking the vehicle with engine: 1, $S_2$, 5, 6, 7, 8, 9, 10, 12, 14, 15, 17, 4, 29, 33, 21.

Commonly, in multi-drive automobiles the transmission brake is located at the rear of the transfer case. Therefore, in this particular instant, a necessity has arisen to provide additional brake 35 on the outer end of output shaft 21 in order to provide for braking the power turbine at the moment of shifting gears in the transfer case.

Thus, the present transmission ensures constant loading of the power turbine and enables shifting into reverse to be made for reverse driving or braking, with the vehicle running in first or third gear. Smooth shifting of clutches $S_1$ and $S_2$ necessary to reverse in order to brake the vehicle is obtained by the provision of a special valve controlled by the accelerator pedal.

Gearshifting is effected by the pneumo-mechanical control illustrated in FIG. 2.

With the use of the penumo-mechanical control, the power of the compressed air is applied only to shift the clutch, operating sleeves 9 and 22 being shifted manually by the use of a lever mechanism. Provision of inertia synchronizers 10, 11, 23 and 24 and the manual control ensures smooth engagement of coupling elements 12, 13, 25 and 26.

The pneumo-mechanical control incorporates a pneumatic system to shift clutches $S_1$ and $S_2$, a shifting mechanism for coupling elements 12, 13, 25, 26 and an electrical signalling system.

The pneumatic clutch shifting system comprises double-acting pneumatic cylinder 36 which has two pistons 37 and 38 whose rod is connected to the operating sleeve of clutches $S_1$ and $S_2$ by means of linkage 40 and valve chest 41 supplying compressed air to penumatic cylinder 36.

The use of two pistons is necessitated by the peculiarities of the characteristic of the pressure spring operating clutches $S_1$ and $S_2$. The spring is composed of two conical discs with radial internal slots, and the spring characteristic curve approximates a sinusoid. The force required to be exerted to the spring is at its maximum at the initial point, then it rapidly decreases and becomes zero when the spring is in mid-position. The second half of the spring stroke is effected by virtue of the spring tension. To preclude shock load in engaging the clutch, the spring action must be opposed during the second half of the spring stroke.

Changing the direction of the force acting upon the spring is achieved by using two pistons 37 and 38, each of which can move only by the amount somewhat exceeding one half the strokes required to shift the clutches. The movement of the pistons is limited by inner shoulder 42 situated on the inner surface of pneumatic cylinder 36. Pistons 37 and 38 have no rigid connection with rod 39. The width of shoulder 43 of rod 39 must exceed that of pneumatic cylinder shoulder 42 so that each piston can travel an amount exceeding one half the stroke of rod 39.

Apart from this, the provision of two pistons in the pneumatic cylinder permits the clutch release bearing (not shown in the diagram) to be relieved of axial thrust after shifting the clutches.

Valve chest 41 is mounted on the side of the clutch gear shifting mechanism and accommodates two valves 44 and 45 whose co-operation is effected by the provision of double-arm rocking lever 46. When the top end of gearshift lever 48 is moved to the left, its bottom end 47 presses against rocking lever 46. After the top end of gearshift lever 48 is moved to the right, rocking lever 46 is returned into its initial position by the action of spring 49 housed in valve chest 41. Therefore, as the upper end 58 of the control lever moves to the left, the lower end 47 of this lever pushes the upper end of the rocking lever 46 to the right, causing the opening of valve 44 and consequent movement of the rod 39 of the pneumatic cylinder to the right. When the upper end 48 of the control lever moves in the opposite direction, the spring 49 acts on the rod of the valve 44, to turn the lever 46 and open valve 45. The valve 44 closes under the force of its own spring, and the rod 39 of the pneumatic cylinder moves to the left.

Compressed air required to exert axial thrust during the first half of the stroke of rod 39 is alternately delivered into front cavity 50 and rear cavity 51 of pneumatic cylinder 36 by synchronous operation of valves 44 and 45. The movement of rod 39 during the second half of the rod stroke is resisted by throttling hole 52 wherethrough the compressed air is vented from the opposite cavity of the pneumatic cylinder to the atmosphere. The intensity of the opposition to the movement of rod 39 influences smoothness of clutch shifting. Particularly smooth clutch shifting is necessary when reversing the power turbine (not shown on the drawing) to brake the vehicle. Since delivery of fuel into the combustion chamber of the gas-turbine engine must be reduced to a minimum at this instant, it has been found most expedient to throttle air discharge from pneumatic cylinder 36 to the atmosphere by means of controlled valve 53 linked to accelerator pedal 55 through rod 54.

The clutch gear shifting mechanism is mounted on the side of the transmission. The housing of said mechanism encloses rocking lever 56 with ball support 58 and two shift forks 59 and 60 mounted on shift shafts 61 and 62 having ball mesh lock 63 and interlock 64 (FIG. 4). The shift forks fit into the circular grooves in operating sleeves 9 and 22. The slots provided in the lugs 65 and 66 of the shift forks serve to take bottom end 47 of rocking gearshaft lever 56.

The shift fork lugs have two slots each. One of the slots, 67, is blind (in lug 65 of the first and third speed fork). The three other slots 68, 69, and 70 are continuous (FIGS. 5 to 9). Blind slot 67 serves for locking first and third speed operating sleeve 22 in the extreme positions. The continuous slots permit the forks to be shifted by the gearshift lever.

Coupling elements 12 and 13 are fixed in the engaged position by means of the projections which are situated on the upper end of lever 46 and fit into slots 69 and 70 in lug 66, whereby the lug and, consequently, coupling elements 12 and 13 (FIGS 6, 8 and 9) are securely locked in place.

Coupling elements 25 and 26 are fixed in the engaged position by interlock 64 fitting into the recesses in shift shaft 61 which carries the fork of operating sleeve 22. When the transmission is shifted in reverse in first and third gear, coupling elements 25 and 26 are additionally locked by means of bottom end 47 of gearshift lever 56 which fits into slots 67 and 70 (FIG. 8) and slots 67 and 69 (FIG. 9) at a time, thereby coupling lugs 65 and 66.

To indicate the operation of the pneumatic system shifting clutches $S_1$ and $S_2$, the transmission control system incorporates two pilot lamps 73 and 74 which are operated by contacts 75 and 76 (FIG. 2) closing when rod 39 of pneumatic cylinder 36 reaches the extreme positions.

Although this invention is described in connection with its preferable embodiment, it is to be understood that changes and modifications may be made without departing from the spirit and scope of the present invention and the following claims, as will be apparent to those skilled in the art.

What is claimed is:

1. A transmission and its control comprising: a case and a gearing case put together; an input shaft and an output shaft arranged in line; a mainshaft and a hollow drive shaft arranged in said gearing case so that said mainshaft, hollow drive shaft and input shaft are in line, said hollow drive shaft and said mainshaft being coaxial; a countershaft parallel to said mainshaft and hollow drive shaft; bearings intended to carry said shafts and mounted in said cases; at least two friction means arranged so that they can be engaged to transmit torque between said shafts; means for engaging and releasing said friction means; gears interconnecting said shafts and rotatably mounted on at least one of said shafts; sliding coupling members arranged to lock solid each of said rotatably mounted gears to its particular shaft; means to shift said coupling members into engagement with said rotatably mounted gears; an epicyclic gear train which has its planet carrier in constant connection with said output shaft, its sun gear in constant connection with said mainshaft and its ring gear so arranged that it can be separately connected to said mainshaft and to said gearing case; a sliding coupling member arranged to separately connect said ring gear to said mainshaft and to said gearing case; means to shift said sliding coupling member in order to separately connect said ring gear to said mainshaft and to said gearing case.

2. A transmission and its control comprising: a case and a gearing case put together; an input shaft and an output shaft arranged in line; a mainshaft and a hollow drive shaft arranged in said gearing case so that said mainshaft, hollow drive shaft and input shaft are in line, said hollow drive shaft and said mainshaft being coaxial; a countershaft parallel to said mainshaft and hollow drive shaft; bearings intended to carry said shafts and mounted in said cases; at least two friction means arranged so that they can be engaged to transmit torque from said input shaft to said mainshaft and hollow drive shaft and can be separately engaged and released, whereby said input shaft can be separately put in and out of engagement with said mainshaft and said hollow drive shaft; gears interconnecting said shafts and rotatably mounted on at least one of said shafts; sliding coupling members arranged to lock solid each of said rotatably mounted gears to its particular shaft; means to shift said coupling members into engagement with said rotatably mounted gears; an epicyclic gear train which has its planet carrier in constant connection with said output shaft, its sun gear in constant connection with said mainshaft and its ring gear so arranged that it can be separately connected to said mainshaft and to said gearing case; a sliding coupling member arranged to separately connect said ring gear to said mainshaft and to said gearing case; means to shift said sliding coupling member in order to separately connect said ring gear to said mainshaft and to said gearing case.

3. A transmission and its control comprising: a case and a gearing case put together; and input shaft and an output shaft arranged in line; a mainshaft and a hollow drive shaft arranged in said gearing case so that said mainshaft, hollow drive shaft and input shaft are in line, said hollow drive shaft and said mainshaft being coaxial; a countershaft parallel to said mainshaft and hollow drive shaft; bearings intended to carry said shafts and mounted in said cases; at least two friction means arranged so that they can be engaged to transmit torque from said input shaft to said mainshaft and hollow drive shaft and can be separately engaged and released, whereby said input shaft can be separately put in and out of engagement with said mainshaft and hollow drive shaft; three gears interconnecting said mainshaft and said countershaft and so arranged that one of said gears is in constant connection with said mainshaft, another gear is in mesh with the first mentioned gear and is mounted in said gearing case so that it is free to rotate, and a third gear is in mesh with the second mentioned gear and is rotatably mounted on said countershaft; a pair of gears interconnecting said hollow drive shaft and said countershaft, wherein one gear is mounted on said hollow drive shaft and affixed thereto, whilst the other gear is mounted on and affixed to said countershaft; another pair of gears interconnecting said countershaft and said output shaft, wherein one gear is rotatably mounted on said countershaft and can be locked solid thereto, whilst the other gear is mounted on and affixed to said output shaft; a sliding coupling member arranged to separately lock solid said gears rotatably mounted on said countershaft; an epicyclic gear train which has its planet carrier in constant connection with said output shaft, its sun gear in constant connection with said mainshaft and its ring gear so arranged that it can be separately connected to said mainshaft and to said gearing case; another sliding coupling member arranged to separately connect said ring gear to said mainshaft and to said gearing case; means to individually shift the first mentioned coupling member into engagement with said gears rotatably mounted on said countershaft and to individually shift the second mentioned coupling member in order to separately connect said ring gear of said epicyclic gear train to said mainshaft and to said gearing case.

4. A transmission and its control comprising: a case and a gearing case put together; an input shaft and an output shaft arranged in line; a mainshaft and a hollow drive shaft arranged in said gearing case so that said mainshaft, hollow drive shaft and input shaft are in line, said hollow drive shaft and said mainshaft being coaxial; a countershaft parallel to said mainshaft and hollow drive shaft; bearings intended to carry said shaft and mounted in said cases; at least two friction means arranged so that they can be engaged to transmit torque from said input shaft to said mainshaft and hollow drive shaft and can be separately engaged and released, whereby said input shaft can be separately put in and out of engagement with said mainshaft and said hollow drive shaft; three gears interconnecting said mainshaft and said countershaft and so arranged that one of said gears is in constant connection with said mainshaft, another gear is in mesh with the first mentioned gear and is mounted in said gearing case so that it is free to rotate, and a third gear is in mesh with the second mentioned gear and is rotatably mounted on said countershaft; a pair of gears interconnecting said hollow drive shaft and said countershaft; another pair of gears interconnecting said countershaft and said output shaft, wherein one gear is rotatably mounted on said countershaft and can be locked solid thereto, whilst the other gear is mounted on and affixed to said output shaft; a sliding coupling member arranged to separately lock solid said gears rotatably mounted on said countershaft, an epicyclic gear train which has its planet carrier in constant connection with said output shaft, its sun gear in constant connection with said mainshaft and its ring gear so arranged that it can be separately connected to said mainshaft and to said gearing case; another sliding coupling member arranged to separately connect said ring gear to said mainshaft and said gearing case; a fork to shift the first mentioned sliding coupling member into engagement with said gears rotatably mounted on said countershaft, whereby said gears are locked solid to said countershaft; another fork to shift the second mentioned sliding coupling member into separate engagement with said mainshaft and with said ring gear of said epicyclic gear train, whereby said ring gear is separately connected to said mainshaft and to said gearing cases, said forks having slots and being mounted on shift shafts whose axes are parallel to said shafts; a gearshift lever having a top end, a bottom end and a ball support situated between said top and bottom ends, said gearshift lever top end being capable of moving in two directions and said bottom end being so arranged as to separately shift the first mentioned fork and the second mentioned fork, to fit into the slot in one of said forks when said gearshift lever top end is moved in one direction and to shift one of said forks along said shift shaft when said gearshift lever top end is moved in the other direction.

References Cited

UNITED STATES PATENTS

| | | | |
|---|---|---|---|
| 2,185,538 | 1/1940 | Burtnett | 74—740 |
| 2,254,335 | 9/1941 | Vincent | 74—740 |
| 2,593,629 | 4/1952 | Swift | 74—740 |
| 2,605,650 | 8/1952 | Winther et al. | 74—740 |
| 2,615,349 | 10/1952 | Winther | 74—740 |
| 2,751,055 | 6/1956 | Dodge et al. | 192—48 |
| 2,775,330 | 12/1956 | Schjolin et al. | 192—48 |
| 2,985,036 | 5/1961 | Forster | 74—740 |
| 3,065,643 | 11/1962 | Mark et al. | 74—740 |
| 3,080,772 | 3/1963 | Foerster | 74—759 |

FOREIGN PATENTS 1,018,329  10/1952  France.

DONLEY J. STOCKING, *Primary Examiner.*

DAVID J. WILLIAMOWSKY, *Examiner.*

T. C. PERRY, *Assistant Examiner.*